(12) United States Patent
Benson

(10) Patent No.: US 11,754,380 B2
(45) Date of Patent: Sep. 12, 2023

(54) DRONE PAYLOAD—ENERGETIC WEAPONS POD

(71) Applicant: TETAC, Inc, Monterey, CA (US)

(72) Inventor: Mark Benson, Monterey, CA (US)

(73) Assignee: TETAC INC., Monterey, CA (US)

( * ) Notice: Subject to any disclaimer, the term of this patent is extended or adjusted under 35 U.S.C. 154(b) by 339 days.

(21) Appl. No.: 16/991,955

(22) Filed: Aug. 12, 2020

(65) Prior Publication Data

US 2021/0116221 A1   Apr. 22, 2021

Related U.S. Application Data

(60) Provisional application No. 62/886,166, filed on Aug. 13, 2019.

(51) Int. Cl.
| | |
|---|---|
| *F42B 12/22* | (2006.01) |
| *B64D 7/04* | (2006.01) |
| *B64C 39/02* | (2023.01) |
| *B64U 101/15* | (2023.01) |

(52) U.S. Cl.
CPC ............ *F42B 12/22* (2013.01); *B64C 39/024* (2013.01); *B64D 7/04* (2013.01); *B64U 2101/15* (2023.01)

(58) Field of Classification Search
CPC ........ F42B 12/22; F42B 30/00; B64C 39/024; B64C 2201/121; B64D 7/04
See application file for complete search history.

(56) References Cited

U.S. PATENT DOCUMENTS

| | | | | |
|---|---|---|---|---|
| 8,893,605 | B1 * | 11/2014 | Hester, Jr. | F41F 3/042 |
| | | | | 89/1.51 |
| 9,863,739 | B2 * | 1/2018 | Hester, Jr. | F41G 7/007 |
| 10,501,185 | B2 * | 12/2019 | Kramer | B64D 1/16 |
| 10,922,982 | B2 * | 2/2021 | Magdaleno | B64C 39/024 |
| 10,926,875 | B2 * | 2/2021 | Klein | F41H 13/0006 |
| 2017/0082397 | A1 * | 3/2017 | Hester, Jr. | B64C 39/024 |
| 2017/0129602 | A1 * | 5/2017 | Alduaiji | G06Q 30/0266 |
| 2017/0129605 | A1 * | 5/2017 | Wu | B05B 12/02 |
| 2017/0144756 | A1 * | 5/2017 | Rastgaar Aagaah | |
| | | | | B64C 39/024 |
| 2018/0245890 | A1 * | 8/2018 | Allen | G08B 15/00 |
| 2018/0330631 | A1 * | 11/2018 | Preston, II | F42B 8/14 |
| 2019/0077503 | A1 * | 3/2019 | Reddy | B64C 3/56 |
| 2019/0202558 | A1 * | 7/2019 | Teetzel | B64C 27/20 |
| 2019/0285388 | A1 * | 9/2019 | Klar | B64C 39/024 |
| 2019/0367169 | A1 * | 12/2019 | O'Leary | F41G 7/226 |
| 2020/0023966 | A1 * | 1/2020 | Stephens | G05D 1/101 |

(Continued)

FOREIGN PATENT DOCUMENTS

| | | | | | |
|---|---|---|---|---|---|
| CN | | 107161346 A | * | 9/2017 | .......... A01M 7/0025 |
| DE | | 2822355 A1 | * | 11/1979 | |

(Continued)

*Primary Examiner* — Benjamin P Lee
(74) *Attorney, Agent, or Firm* — Gorman IP Law, APC; Susan W. Gorman

(57) ABSTRACT

A lightweight energetic weapons pod 2 that integrates to unmanned aerial systems 1 that enables the operator the ability to engage targets without flight degradation. The device utilizes an energetic weapons pod 2 that may be reloaded to support sustained combat operations. The ability of the device to function as intended is based on explosive mitigation compression zones and recoilless configurations that allow drone survivability during detonation events.

22 Claims, 11 Drawing Sheets

(56) References Cited

U.S. PATENT DOCUMENTS

| | | | |
|---|---|---|---|
| 2020/0083979 A1* | 3/2020 | Roberts | B64D 7/00 |
| 2020/0247540 A1* | 8/2020 | Jones | B64D 7/08 |
| 2020/0284566 A1* | 9/2020 | Viviani | B64D 7/00 |
| 2020/0333783 A1* | 10/2020 | Stephens | F42B 23/10 |
| 2021/0253250 A1* | 8/2021 | Kim | B64C 39/024 |
| 2022/0082357 A1* | 3/2022 | Smith | F41H 13/0025 |

FOREIGN PATENT DOCUMENTS

| | | | | |
|---|---|---|---|---|
| FR | 2987032 A1 * | 8/2013 | | B64D 1/04 |
| KR | 102299872 B1 * | 9/2021 | | |

* cited by examiner

DRONE PAYLOAD—ENERGETIC WEAPONS POD

CROSS-REFERENCE TO RELATED APPLICATIONS

This Nonprovisional Application claims priority under 35 U.S.C. § 119(e) on U.S. Provisional Application No. 62/886,166 filed on 13 Aug. 2019, the entire contents of which is hereby incorporated by reference in its entirety.

GOVERNMENT SPONSORED RESEARCH

The invention was made with government support under contract number FA864920P0890 awarded by the Department of Defense office of Joint Small Business Innovative Research (DOD SBIR). The government has certain rights in the invention.

TECHNICAL FIELD

Embodiments of the present invention relate to the technical field of unmanned systems. More particularly, the embodiments of the present invention are directed to energetic payloads.

BACKGROUND OF THE INVENTION

Unmanned systems, or drones, are emerging as the technology of the future for militaries worldwide. Currently, drones are used for aerial, terrestrial (Unmanned ground vehicle; UGV), underwater (unmanned underwater vehicle UUV), and surface water (unmanned surface vehicle; USV) operations. Drones provide the end user with an organic, real-time reconnaissance, surveillance, and target acquisition capability. Examples of aerial drones, i.e. Unmanned Aerial Systems (UAS) technologies that are currently being used for military applications include the FLIR SkyRanger and the InstantEye Gen IV to name a few.

One advantage of a UAS, UGV, UUV, and/or USV is that the systems provide the warfighter with information and provide capabilities while remaining relatively inexpensive. Another advantage of unmanned systems is that the systems are capable of interacting to achieve common goals. Specifically, numerous drones can be programmed to work in synchronization to conduct coordinated reconnaissance, target acquisition, data gathering, explosive clearance operations, and offensive strike operations. Examples of where swarm technologies may be effective include the mission of systematically clearing buildings and city streets when enemy forces are located in urban environments.

While smaller and lighter swarms of drones represent the future of warfare, the method in which they carry out offensive strike capabilities is primarily assumed to consist of a kamikaze type attack. One example of a kamikaze style aerial drone is the Aeryon Switchblade. In the case of the Switchblade, it is launched by soldiers in the field and used to strike targets from the air. Therefore, the Switchblade is considered a loitering munition, where the munition flies in circles above the battlespace and then flies down from above to engage the target. Upon target engagement, the entire system is consumed at a cost of nearly $80,000.00 per unit. Some of the high priced components consumed by the detonation event include the radios, fire control systems, night vision cameras, motors, and flight control systems to name but a few. Similar situations occur when UVG, UUV, and USV systems are used in similar manners.

Other offensive strike methods being sought include the development of drones capable of firing grenades or miniature missiles. This approach preserves the expensive components of the UAS, UVG, UUV, and/or USV and is less expensive because the system is capable of being used for multiple flight engagements. The negative aspects of this "projectile launch" approach is that the drone is required to fire far enough away from the intended target that it does not get damaged when the detonation of the warhead occurs. As an example, a 40 mm grenade (the M433) that is used in the military has a hazardous fragmentation distance (causes casualties withing 130-meter radius) that requires the projectile to arm only after having traveled a distance between 14-27 meters. Therefore, as an example, the UAS would only be capable of engaging targets that are at least 14 meters away but could sustain damage as close as 130 meters from the intended target. This results in a zone where enemy combatants are unable to be engaged due to these "fuzing" and distance challenges.

The self-fratricide approach described above creates targeting challenges for drones conducting operations in confined spaces such as within buildings or on city streets. Quite simply, the complexity and distances of urban combat prevents both the grenade/missile approach from being utilized and the kamikaze type approaches remains cost ineffective.

BRIEF SUMMARY OF THE INVENTION

The complexity associated with developing technological solutions for engaging enemy combatants from unmanned aerial, terrestrial, underwater, and surface water platforms is quite extensive. These challenges are amplified for engaging targets at close proximity. Therefore, there is a need to develop offensive weapon systems that are capable of engaging enemy combatants in complex environments and at close range. The weapons systems must be lightweight, modular, and should be capable of being fired without causing self-destruction and/or flight degradation in the case of UAS systems while persevering the drone for continued operations.

Secondly, the offensive weapons system should be capable of providing the drone with one or more explosive options. For anti-personnel targets, the offensive weapons system should be capable of using directional fragmentation projectiles and be able to engage targets from 0 to 60 meters or more. These distances would require the explosive event to occur close to or at the position of the drone to enable engagement at close ranges. For hardened targets, the offensive weapons system should be capable of penetrating steel using conical shape charges or explosively formed penetrators. Finally, counter improvised explosive device (CIED) charges could be used where the charges utilize water to disrupt the explosive train of the device. This approach would enable explosive ordnance disposal technicians with the capability of rendering safe explosive hazards from a UAS, UGV, UUV, and/or USV.

For UAS systems, to provide aerial engagement capabilities, the offensive weapons system should provide the operator with a warhead capability but protect the aerial system from the detonation event. The UAS rotor blades, mechanical structure, electronics, and other components of the drone must remain unaltered during the detonation sequence to prevent the UAS from crashing or experiencing degraded flight performance.

Therefore, it is an objective of the present invention to present a UAS that is optimized for performance while firing explosive warheads from an energetic weapons pod. To accomplish this, the UAS flight structures are positioned in a way to prevent damage during the detonation event where the detonation event occurs on the drone. This includes having the propellers, motors, antennas, and airframe configured to optimize the positioning and firing of the energetic weapons pod. Doing so will enable the UAS the ability to maintain flight and to be preserved for multiple missions.

It is a further the objective of the present invention to present a modular offensive weapon system that fits below the presented UAS and which consists of an energetic weapons pod where the energetic weapons pod may be used to engage enemy combatants at ranges of 0 to 60 meters and more.

It is a further objective of the present invention to utilize the offensive weapon system for counter improvised explosive clearance and unexploded ordnance neutralization operations where explosive warheads could be utilized.

It is a further the objective of the present invention to provide interchangeable explosive warheads that are interdependently fired from the UAS, UGV, UUV, and/or USV. Examples of some warheads that insert into the energetic weapons pod include explosively formed penetrators, conical shape charges, directional fragmentation projectiles, and explosive ordnance disposal projectiles for defeating improvised explosive devices to name a few.

It is still a further objective of the present invention to independently fire one, two, three, or more explosive warheads from the energetic weapons pod where the number of warheads is determined by the end user based on weight, power of the unmanned system and, in the case of a UAS, flight endurance.

It is still a further objective of the present invention that the energetic weapons pod be lightweight, have a small form factor, remain recoilless when fired, and prevent the drone from sustaining adverse effects from the detonation event. Unlike a gun type disruptor (that uses a breach), the energetic projectiles are fired without exerting a rearward acceleration. This enables the device to be mounted to a remotely operated vehicle and fired without exerting unnecessary forces to the drone.

It is also an objective of the present invention to have reloadable energetic weapons pods that are replaced when expended. Such a feature provides soldiers the ability to conduct multiple engagements with the same drone by simply replacing the expended pod.

It is yet a further objective of the present invention to optimize the energetic weapons pod weight and performance by using mitigating energy absorption materials in a blast chamber configuration that is capable of withstanding the detonation event and that channels energetic energy away from the UAS, UGV, UUV, and/or USV.

It is a further objective of the present invention that the weapons system be created as a standalone system, if needed, where the energetic weapons pod includes a built-in power supply, targeting cameras, wireless communications, fire control system, end user control console, and an open architecture for future technologies, and other features that would enable it to be fitted to current drones such as the FLIR SkyRanger, Instant Eye Gen IV, and/or other UAS. Similar requirements are needed for efficient integration into UVG, UUV, and/or USV systems to provide similar energetic capabilities.

It is finally another objective of the present invention that the weapons system may be used on all unmanned systems, i.e. UAS, UVG, UUV, and USV, to provide swarm attacks simultaneously in all environments. By placing the weapons system on air, land, and sea platforms, the warfighter could be equipped to conduct simultaneous swarm attacks from different environments using small drones.

BRIEF DESCRIPTION OF THE DRAWINGS

The present invention will become more fully understood from the detailed description given herein below and the accompanying drawings which are given by way of illustration only, and thus are not limitative of the present invention, and wherein.

DETAILED DESCRIPTION OF THE ILLUSTRATED EMBODIMENTS

Figure 1:
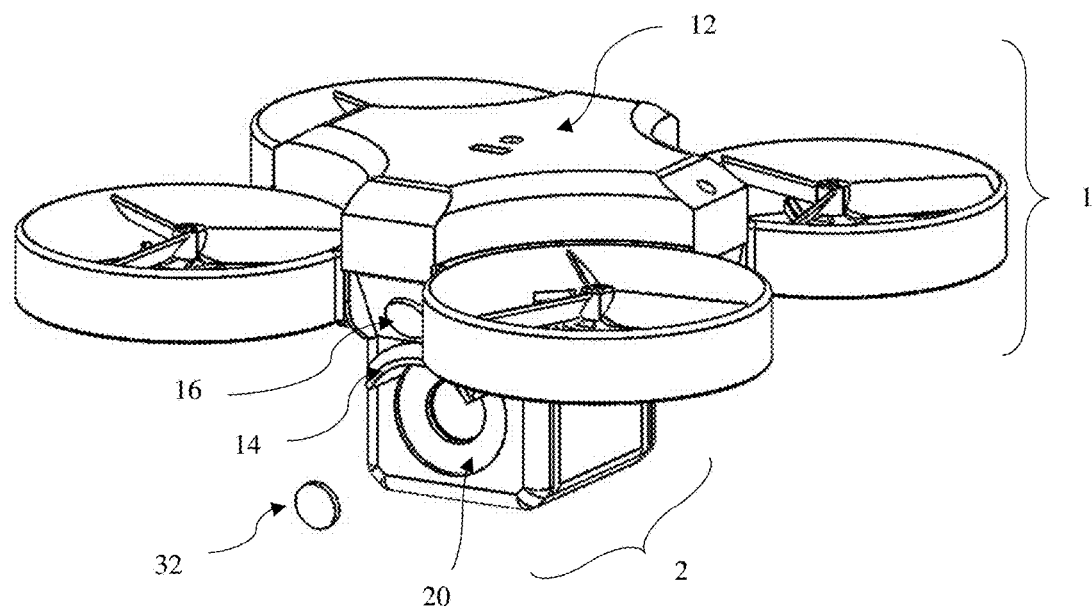
FIG. 1. illustrates the invention and method of use of the UAS 1 and energetic weapons pod 2 in combination for single shot application.

The present invention will now be described in detail with reference to the accompanying drawings, wherein the same reference numerals will be used to identify the same or similar elements throughout the several views. It should be noted that the drawings should be viewed in the direction of orientation of the reference numerals.

FIG. 1 is an engineering drawing of the energetic weapons pod 2 when integrated to an unmanned aerial system (UAS 1). The figure shows a UAS 1 that is less than 10 inches by 10 inches×6 inches high and which is equipped with a single blast chamber assembly 20 located within the energetic weapons pod 2. The image is presented to illustrate that the smaller UAS 1 can carry a single blast chamber assembly 20 within the energetic weapons pod 2 meaning that the UAS 1 shown is capable of firing one munition 30 at a time. This version of UAS 1 and energetic weapons pod 2 is ideal for smaller aerial systems that can fly thru small spaces such as urban environments or into buildings.

FIG. 1 shows primary components that include the UAS 1, the energetic weapons pod 2, the blast shield 14, the blast chamber assembly 20, and the targeting system 16 that is located within the airframe and housing 12. Also shown in the image is an explosively formed penetrator 32 that is included to illustrate the capability of the system to fire explosive projectiles, which may be used to penetrate hardened targets.

Figure 2:
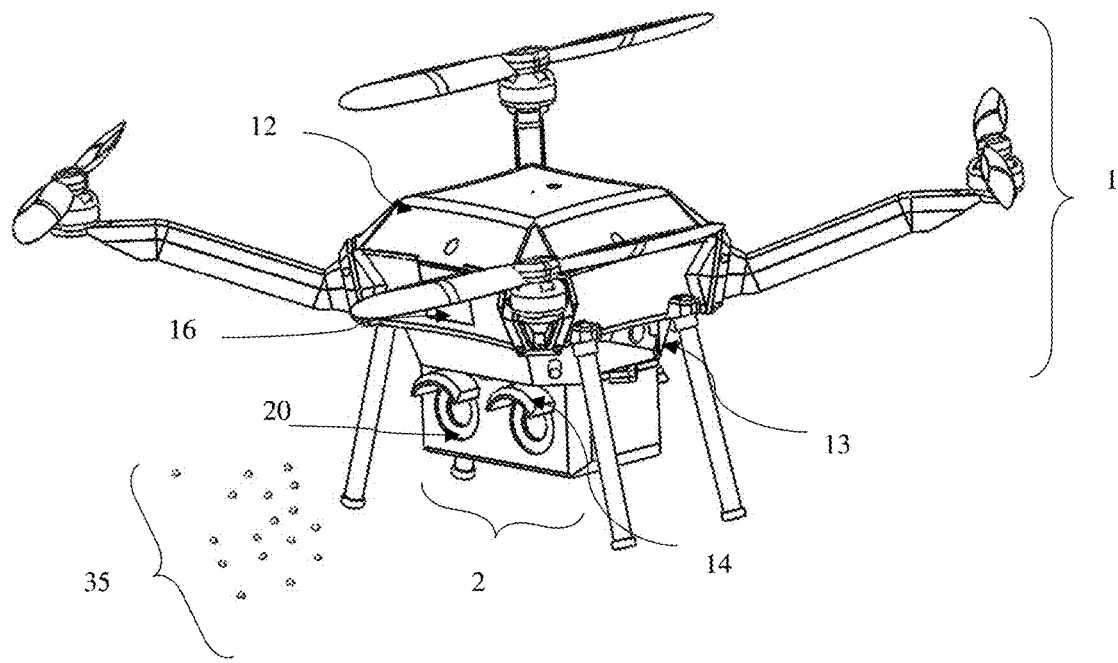
FIG. 2 illustrates the invention and method of use of the UAS 1 and energetic weapons pod 2 where multiple shots are available using a larger UAS 1.

FIG. 2 is another version of the system that illustrates the energetic weapons pod 2 when integrated to a larger unmanned aerial system (UAS 1). The larger UAS 1 is advantageous for handling multiple blast chamber assemblies 20 leading to an increased number of explosive munitions 30 that are capable of being fired one at a time or together when initiated from the UAS 1. Those familiar with aerial systems and explosive operations should understand that the energetic weapons pod 2 could fire one, two, three, or numerous explosive munitions 30 depending on the flight capabilities of the UAS 1. Furthermore, these explosive munitions 30 may be fired independently of each other or detonated simultaneously.

FIG. 2 includes the primary components presented in FIG. 1 which includes the UAS 1, the energetic weapons pod 2, the blast shield 14, the blast chamber assembly 20, and the targeting system 16 that is also located within the airframe and housing 12. These primary components represent the architecture required to operate the energetic weapons pod 2 where the airframe and housing 12 is a lightweight to strength ratio material such as carbon fiber or light weight resins. The purpose of the airframe and housing 12 is to provide structural supports to enable attachment of the energetic weapons pod 2. For the aerial drone configuration shown, the airframe and housing 12 is used to hold the flight controller, sensors, and various items used to support operational use of the drone to include propulsion. Included on the front of the airframe and housing 12 is the targeting system 16, which could include a simple camera, such as the FLIR Haldron, or include complex targeting systems 16, such as those available for use on defense aircraft available through Lockheed Martin or Raytheon.

An optional remote firing device housing 13 is shown in FIG. 2. While the fire control system 3 could include a safe and arming system within the airframe and housing 12, the optional remote firing device housing 13 is included to enable the end user to use commercially available remote firing devices that are certified by the military weapons systems explosive safety explosive review board (WS-ESRB). This versatility eases integration of the energetic weapons pod 2 for other UAS 1 platforms. FIG. 2 also shows directional fragmentation 35 projectiles in front of the blast chamber assembly 20. This illustrates the firing of the directional fragmentation 35 projectiles to engage antipersonnel combatants or light skinned targets.

The unique feature of the energetic weapons pod 2 in FIG. 1 and FIG. 2 is that the system fires explosive munitions 30 that originate at the drone and fire without damaging the drone or degrading flight performance. This approach enables the drone to engage targets from 0 to 60 meters and further while continuously providing the solider with real-time reconnaissance, surveillance, and target acquisition information even after detonation of the explosive munitions 30. Furthermore, once the drone expends the explosive munitions 30, it may return to be reloaded with a new energetic weapons pod 2. Therefore, the UAS 1 in combination with the energetic weapons pod 2 saves money when compared to other loitering munitions because the preservation of the drone ensures that the night vision optics, radios, and other hardware can be reused during continuous operations.

Figure 3:
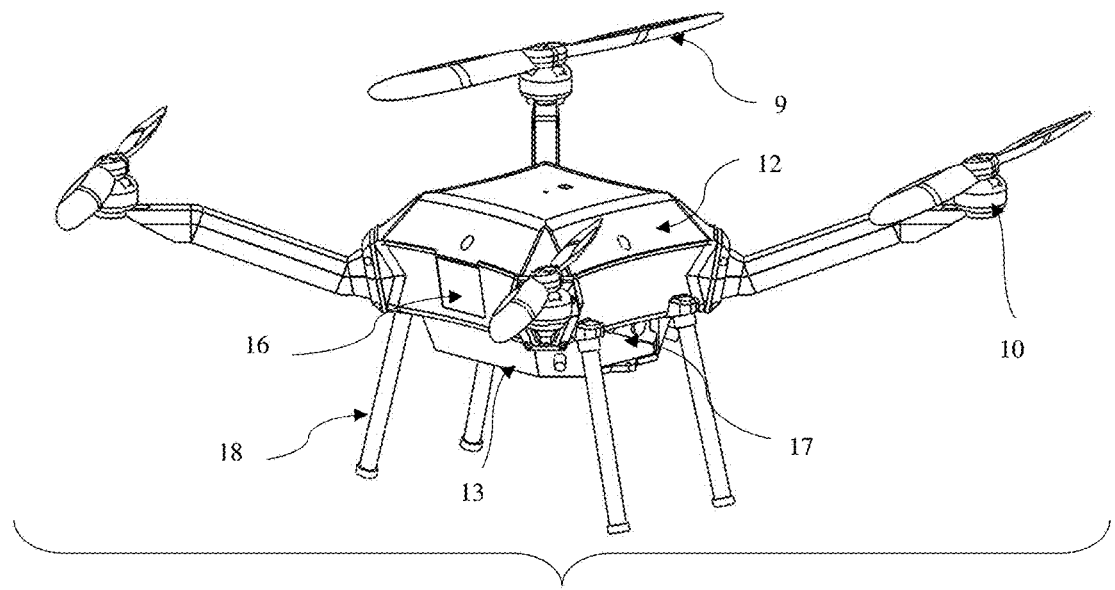
FIG. 3 is a perspective view of the base components of the UAS 1 that are used to support the methods of the use of the invention.

FIG. 3 is an engineering drawing showing a perspective view of the UAS 1 without the energetic weapons pod 2 attached. The figure shows the propellers 9, motors 10, the airframe and housing 12, and the landing supports or landing gears 18. Each of these components are considered to be base components that are commercially available. Examples of propellers 9 include propellers 9 manufactured by Tiger where they are manufactured from lightweight composites or carbon fiber and where the purpose of the propellers 9 is to provide lift when used in combination with a motor 10. The propellers 9 can have multi vanes depending on the required configuration. The motors 10 are also commercially available and examples of motors that could be used include Tiger motors that are water and dust proof, and which have good lift capabilities and energy efficiencies.

The airframe and housing 12 shown is designed to support the electronic and mechanical systems required to control, communicate, and fly the UAS 1. These systems are housed within the airframe and housing 12 and examples of systems that would be included within the configuration include cameras, night vision cameras, antennas, fire control systems, radios, electronic speed circuitry, secondary motors, gimbals, laser range detectors, computers and sensors to support artificial intelligence, LIDAR, electronic attack weapons, power sources, wirings, and other hardware/software items. Below the airframe and housing 12 is the landing supports or landing gears 18. These are also commercially available, such as from Rockwest Composites, and typically manufactured from carbon fiber or other lightweight but strong materials.

Also shown in FIG. 3 is the targeting system protective barrier 16. The targeting system protective barrier 16 is shown to be attached to the airframe and housing 12 and it represents a viewing window that shields cameras, lasers, and other targeting hardware from the pressure and explosive residues generated during the detonation of the explosive munitions 30. Examples of the targeting system protective barrier 16 include polycarbonate or other transparent or semi-transparent material that is capable of withstanding the blast energy. One familiar with targeting sensors would also recognize that the targeting systems could be located outside of the airframe and housing 12. One example of this would include the use of a camera on a gimbal located on the exterior of the airframe and housing 12.

FIG. 3 also shows the location of the optional remote firing device housing 13 located below the UAS 1 airframe and housing 12. The remote firing device housing 13 is optional because some versions of the UAS 1 incorporate the remote firing device within the airframe and housing 12.

Both the remote firing device that is inserted into the remote firing device housing 13 and the remote firing device housed within the airframe and housing 12 are commercially available, such as from FFI Tactical. The benefits of having an optional remote firing device housing 13 is that a remote firing device may be inserted into the slot 17 and secured below the UAS 1 to support the use of standard blasting caps and standard bulk explosives used to detonate the explosive munitions 30. Using standard blasting caps and explosives is important because it sidesteps the need for extensive explosive safety review board processes, which is required when the remote firing device is integrated within the airframe and housing 12.

Figure 4:
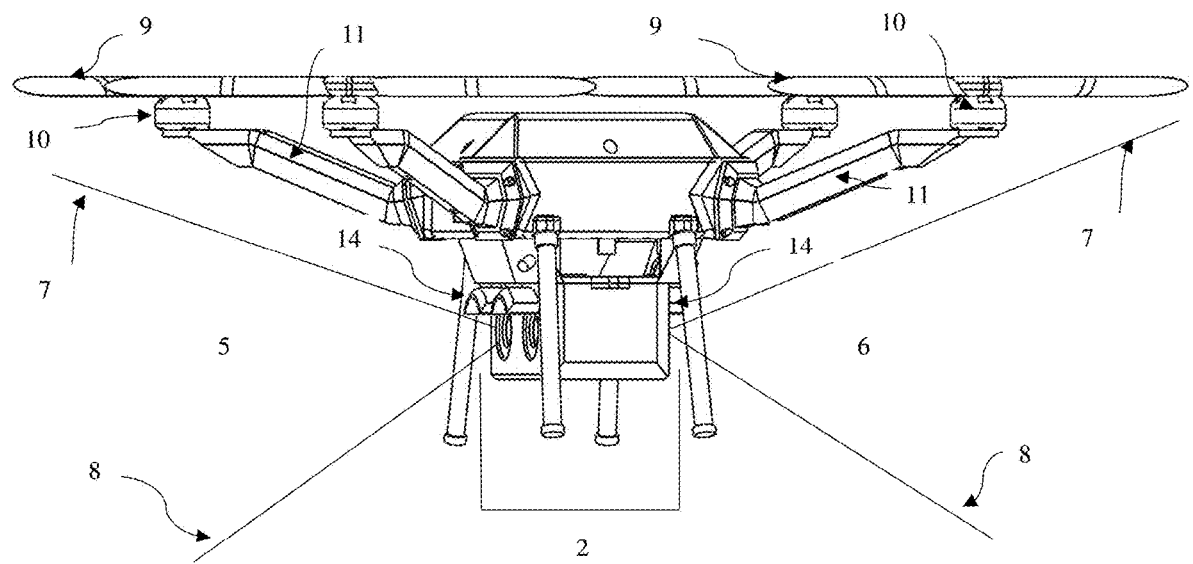
FIG. 4 is a perspective view of the UAS 1 and energetic weapons pod 2 when prepared for operation.

The UAS 1 shown is capable of firing explosive munitions 30 directly from the drone based on the system design and configuration of the energetic weapons pod 2 and related components without damage to the drone and without degradation of flight performance. FIG. 4 is an engineering drawing that shows the relationship between these components. To maintain flight performance, the energetic weapons pod 2 is designed to protect the UAS 1 from explosive overpressure gases, fragmentation, heat, and also mitigate recoil.

Therefore the energetic weapons pod 2 in combination with the UAS 1, or any other unmanned vehicle, has several unique features. First, the device is recoilless meaning that there is a negligible force applied to the airframe and housing 12 of the UAS 1 during detonation or to the physical structure of a drone used for terrestrial, underwater, or surface water operations. When integrating to unmanned systems, it is important to realize that a recoil force, if present, would have detrimental effects to small drones. This is one reason that a gun type projectile is not feasible for smaller unmanned systems. The weight of counter recoil systems also makes these types of devices less feasible.

Second, a blast chamber assembly 20 or sandwich panel assembly is used to contain the explosive detonation gases and fragmentation of the munition 30 where the explosive gases and fragmentation is minimized to travel primarily along a single axis or direction. This approach prevents the explosive energy generated by the munition 30 from destroying the UAS 1 or other unmanned vehicle positioned in direct vicinity of the munition 30. Alternatively, a sandwich panel configuration 60 provides protection to the drone from explosive energy generated by the munition 30 while still enabling adequate flight performance and/or travel accuracy. It should be noted that this configuration would generate an upward force into the drone and would therefore be a less effective method for controlling the detonation of the munition 30 where flight instability could result.

Third, a blast shield 14 can be integrated to the energetic weapons pod 2. The blast shield protrudes from the upper housing 52 and is located over the cut-out that contains the blast chamber assembly 20 to create a frontal explosive zone 5 and a rear explosive zone 6. This is important for air-based drones and has advantages for terrestrial drones. The frontal explosive zone 5 and rear explosive zone 6 are used to prevent hot exhaust gases, overpressure, and fragmentation from striking the UAS 1 that would otherwise damage critical flight components or cause the UAS 1 to crash. As an example, if excessive heat, pressure, or fragments generated during the detonation of the munition 30 were to strike the propeller 9, motor 10, or propeller/motor supports 11 then the UAS 1 would most likely crash or at least suffer flight degradation. Similarly, when used with a UGV, UUV, and/or USV, those vehicles are also protected from hot exhaust gases, overpressure, fragmentation, and any deterioration of travel performance resulting from those forces. In some cases, for example with some UUVs, a blast shield 14 is not required because those rated for deep dives are capable of withstanding pressures that exceed the pressures generated during the detonation event.

FIG. 4 also shows a unique relationship between the propellers 9, motors 10, propeller/motor supports 11, and the UAS 1. Upon inspection, it is evident that the propeller/motor supports 11 elevate the motors 10 and propellers 9 away from the front explosive zone 5 and the rear explosive zone 6 thereby ensuring that the components are above the upper limits 7 of the trajectory of the particles that determine the limits of the explosive zones. The lower limit 8 of the explosive zone is also shown. The creation of a front explosive zone 5 and rear explosive zone 6 ensures that the host drone remains free of damage that may otherwise occur if components of the drone were located within a blast zone where it would experience negative affects generated by the explosive event.

Figure 5A:
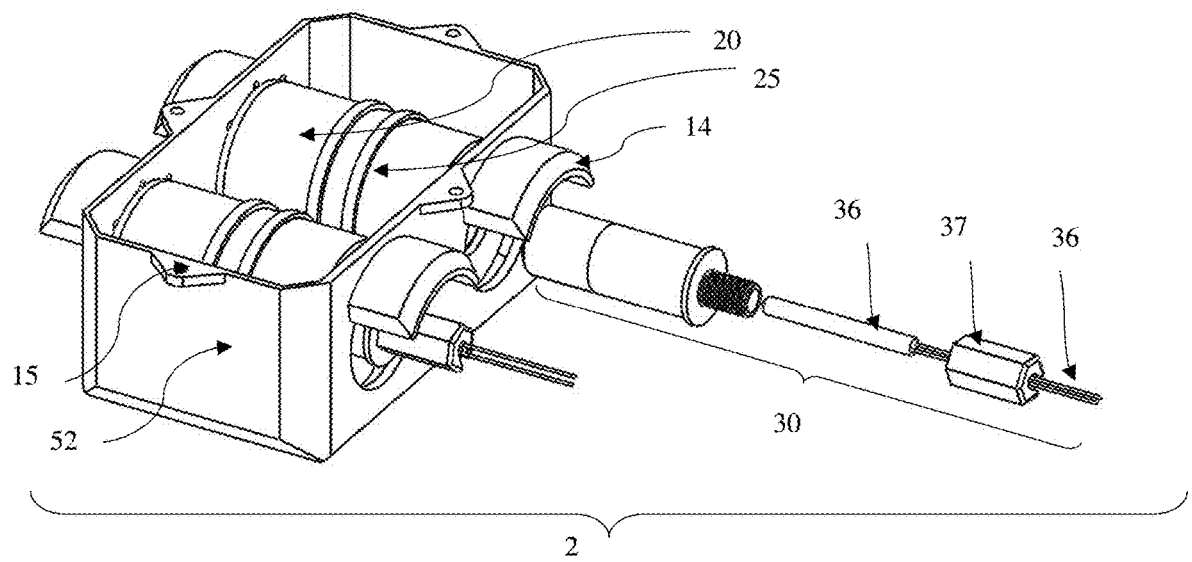
FIG. 5A is a rear perspective view of the energetic weapons pod 2 as configured for one embodiment of the present invention.

FIG. 5A is an engineering drawing of the energetic weapons pod 2 that is integrated to the UAS 1 or other unmanned vehicle. The purpose of the energetic weapons pod 2 is to serve as a lightweight system that supports the blast chamber assembly 20, the explosive munitions 30, and directs explosive energy using an integrated blast shield 14. As discussed, the version shown does not include the fire control system 3, targeting system 16, power supplies, or other components as the system uses these components located within the airframe and housing 12. Other embodiments (not shown) co-locate these components enabling a standalone energetic weapons pod 2 that is similar to the energetic weapons pod 50 and that allows a standalone version of the energetic weapons pod 2 to integrate to other UAS 1 platforms such as the FLIR SkyRanger or InstantEye Gen IV. Furthermore, this modular energetic weapons pod 2 integrates to unmanned ground vehicles, unmanned service vessels, and other robotic platforms.

The energetic weapons pod 2 is constructed of lightweight materials such as carbon fiber or resin-based plastics and formed to hold any number of blast chamber assemblies 20. In the case of FIG. 5A, the energetic weapons pod 2 is used to hold two blast chamber assemblies 20 and integrates to the airframe and housing 12 using fasteners located at each of the attachment points 15. Suitable fasteners include a latch system, screws, nuts and bolts and washers, living hinge type fasteners, buckle, or similar type fastener that can connect the upper housing 52 to the airframe and housing 12 or to the drone frame of a UGV, UUV, or USV. The securing mechanisms can also include an O-ring, wax, or other types of substances that create a water-tight seal. The two blast chamber assemblies 20 are inserted into the upper housing 52 through cut-out portions located on opposite surfaces of the upper housing 52. The blast chamber assemblies 20 are attached to the upper housing 52 of the energetic weapons pod 2 using chamber mount brackets 25. The chamber mount brackets 25 are constructed of lightweight resin-based plastics or carbon fiber and are intended to fail during detonation. This designed failure occurs when the blast chamber assembly 20 expands during the detonation event thereby reducing any loading that may be translated from the blast chamber assembly 20 to the energetic weapons pod 2.

Within each blast chamber assembly 20 is an explosive munition 30. FIG. 5A shows one munition 30 inserted into the blast chamber assembly 20 and the second explosive munition 30 is shown with the components separated. Components of the explosive munition 30 include the initiation system 36 (i.e. blasting cap and wires) and a securing cap 37.

Other embodiments (not shown) of the munition 30 utilize prepackaged explosive loads, while the version presented includes a hand packed explosive type where bulk explosive, a blasting cap, and sheet explosives are used in combination to achieve the desired explosive performance.

To expand the capabilities of the energetic weapons pod 2, the energetic weapons pod 2 can also be used in combination with a targeting system 16, fire control system 3, and other components within a single housing. This enables the energetic weapons pod 2 to easily integrate to other platforms such as unmanned ground vehicles, unmanned underwater vehicles configured for specific uses or situations.

Figure 5B:
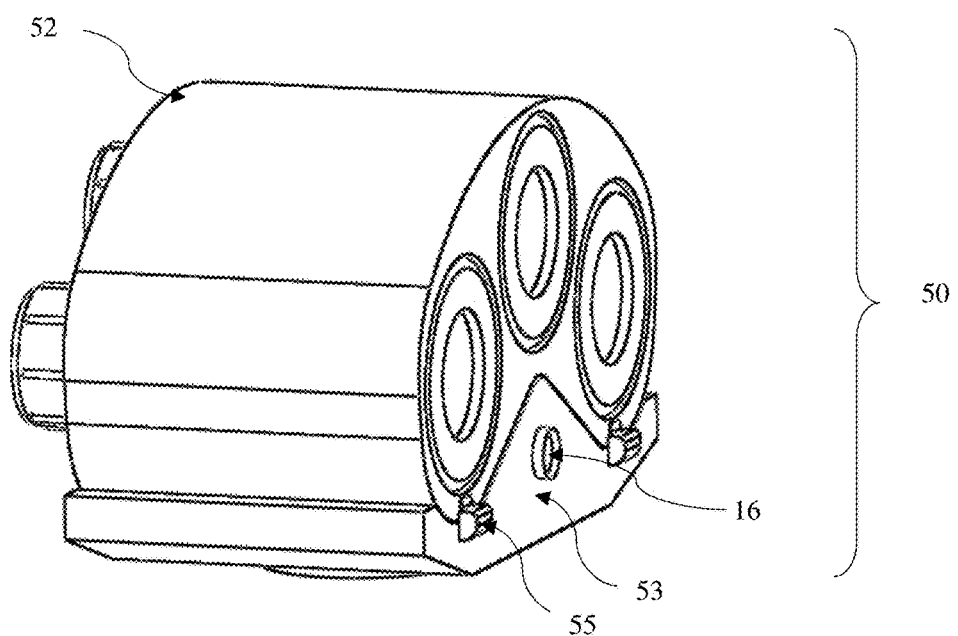
FIG. 5B is a front perspective view and FIG. 5C a rear perspective view of the energetic weapons pod 50 as configured for another embodiment of the present invention.
Figure 5C:
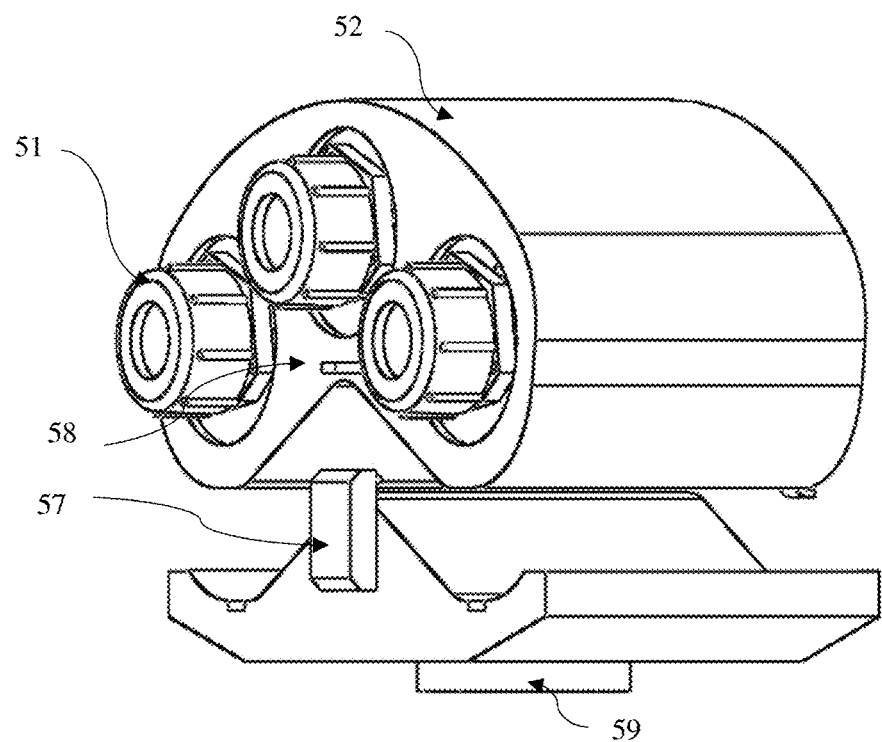

FIG. 5B and FIG. 5C illustrate another embodiment for the energetic weapons pod 50 which contains the needed hardware and software systems, allowing the energetic weapons pod 50 to be attached to any type of drone. FIG. 5B is a perspective view of the energetic weapons pod 50. The system is comprised of two primary sub systems. These include the upper housing 52 and the lower housing 53. The upper housing 52 mates to the lower housing 53 via two housing clips 55 located on the front face of the lower housing 53. This provides rapid reloading capabilities of the energetic weapons pod 50 when the system requires reloading. The targeting system 16 is also shown in FIG. 5B.

In this embodiment, the primary purpose of the upper housing 52 is to support the blast chamber assembly 60, securing cap 62, and the threaded cap retainer 63. For this reason, the upper housing 52 may be manufactured from lightweight materials that provide adequate structural support. Materials that accomplish this may include plastics, lightweight metals, composites or combinations thereof. The upper housing 52 consists of a front and rear face. FIG. 5B shows located on each face three through holes where each individual blast chamber assembly 60, securing cap 62, and threaded cap retainer 63 may be inserted. Any number of methods may be used to secure the individual blast chamber 60, securing cap 62, and threaded cap retainer 63 within the upper housing 52 and examples include swing gates mounted on each face of the upper housing 2, tapered holes that support a press fit of the individual blast chamber assembly 60, securing cap 62, and threaded cap retainer 63, or a forward and rear plate that secures the devices in position. It should also be noted that more than three or less than three through holes may exist on the support housing 52 without changing the intent of the invention.

Below the upper housing 52 is the lower housing 53. The lower housing 53 serves as the base attachment for the energetic weapons pod 50 system. The CPU, targeting cameras, battery storage, initiation system, wireless receivers, transmitters, as well as other supporting hardware and software are incorporated into the lower housing 53 and/or upper housing 52. All of these supporting hardware and software components are commercially available from suppliers such as Rothesbuhler Engineering, FLIR Hadron, Auterion Skynode, Spektrum, Silvus Technologies, and the like. The lower housing 53 also serves as a structural support member for the energetic weapons pod 50. Because of this, it may also be manufactured from strong materials that are relatively lightweight and be of similar design to that of the upper housing 52.

FIG. 5C provides additional details for this rendition of the upper housing 52 and lower housing 53. Specifically, FIG. 5C illustrates the rearward perspective of the system. Features shown include the latch point 58 and the drone integration bracket 59 which are used to secure the upper housing 52 to the lower housing 53. This includes the use of a securing latch 57 located on the lower housing 53 which is fastened to the latch point 58 located on the upper housing 52. The securing latch 57 may be a living hinge type fastener, buckle, or similar type fastener that can connect the two system together.

The drone integration bracket 59 is also shown below the lower housing 53 in FIG. 5C. It is used to connect the energetic weapons pod 50 to a drone. It should be recognized by those skilled in the art that additional mechanical gearing and servos may be incorporated at either the lower housing 53 or at the drone interface to provide the energetic weapons pod 50 with the ability to swivel, pitch, or yaw thereby increasing targeting capabilities of the system.

Figure 6:
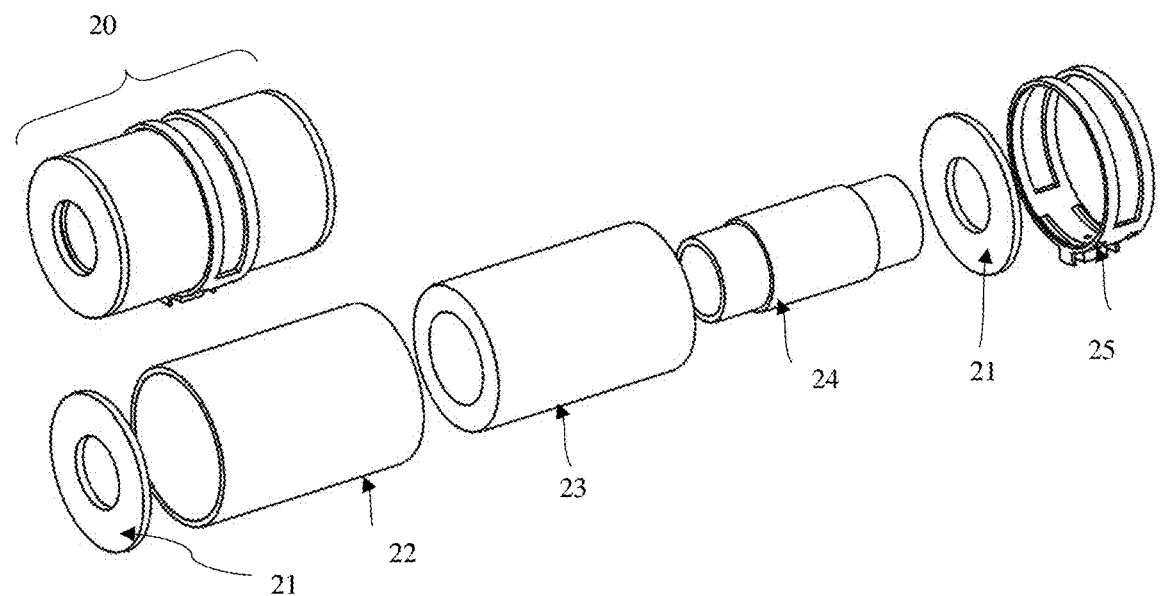
FIG. 6 is a perspective view of the blast chamber assembly 20 as configured for one embodiment of the present invention.

FIG. 6 shows the components of the blast chamber assembly 20 which are presented to contain the detonation event of the energetic weapons pod 2 along a single axis. The blast chamber assembly 20 is also used to center the munition 30, direct explosive gases and fragmentation, and preserve the UAS 1 from undesirable damage.

The components of the blast chamber assembly 20 consist of the outer tube 22, the internal tube 24, and two end caps 21. The outer tube 22 consists of a cylinder that has an outer diameter and internal diameter. Within the outer tube 22 is an explosive mitigation material 23 which is used to reduce the weight of the system while absorbing detonation energy generated during the explosive event occurring within the internal diameter of the explosive mitigation material 23. Examples of these types of materials could include honeycomb, foam metals, high strength carbon or other such materials that are able to absorb energy but do so with relatively small amounts of weight gain. The explosive mitigation material 23 surrounds the internal tube 24. The system is then closed on each with an end cap 21 where the end cap 21 has an outer diameter equivalent to the outer diameter of the outer tube 22 and an internal diameter that matches the internal tube 24. The end cap 21 is used to confine explosive gases and to keep the explosive mitigation material 23 within the blast chamber assembly 20. The outer tube 22, internal tube 24, and end caps 21 are constructed of high strength materials that possess light weight attributes. The components listed must provide hoop strength and must be able to withstand high pressure and heat generated during the detonation event. Therefore, examples of materials that are adequate include titanium, carbon fiber, or even steel if the weight and costs issues dictate. A strong mechanical connection is also required between the outer tube 22 and the end caps 21. Suitable mechanical connections include a weld seam to connect the two parts, soldering, riveting, threads on outer tube 22 and end caps 21, fasteners such as screws, nuts and bolts and washers, adhesives, etc.

It should be noted that the blast chamber assembly 20 has been designed to be consumed upon detonation where the system is optimized with a large amount of explosive loading. Those familiar with explosive operations will recognize that decreasing the amount of explosive used could facilitate the reuse of the blast chamber assemblies 20 to further reduce cost, but explosive performance would be degraded and the system may require recertification of the pressure system to meet quality assurance requirements. The system presented is designed to optimize explosive performance at minimum weight requirements. The blast chamber assembly 20 absorbs and diffuses explosive energy generated during the detonation event. It also provides recoilless firing of the explosive munition 30.

Figure 7:
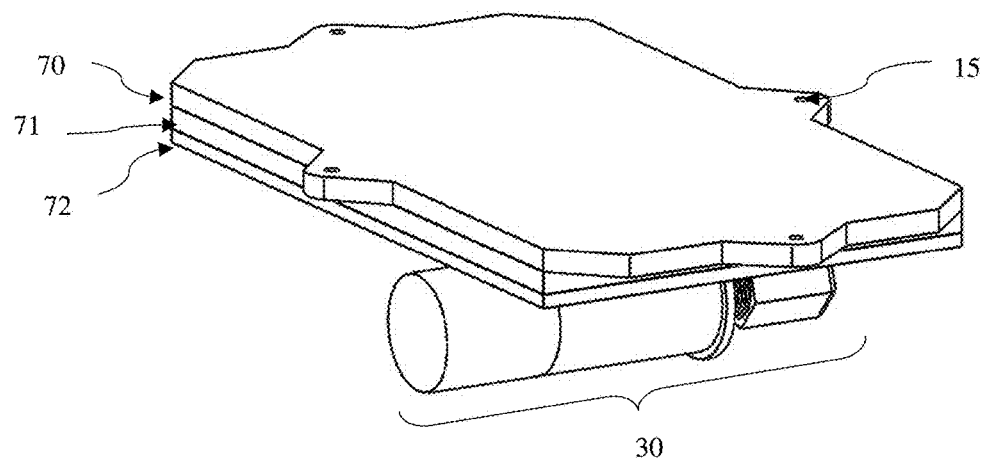
FIG. 7 is a perspective view of a second iteration of the energetic weapons pod 2 where a blast mitigation zone is created as an alternative to using a blast chamber assembly 20.

FIG. 7 is an engineering drawing of yet another configuration that may be used to mitigate the blast and protect the drone from explosive gases and fragmentation. The image shows the explosive munition 30 beneath a sandwich panel configuration where a top plate 70 is separated from a bottom plate 72 by explosive mitigation materials 71. The top plate 70 and bottom plate 72 are used to create a compression zone and distribute energy into the explosive mitigation materials 71. The materials used would be similar to the blast chamber assembly outer tube 22 and inner tube 24 and could be manufactured from titanium, steel, carbon fiber or other material that is lightweight but has good strength attributes. Much like the blast chamber assembly 20 and 60, the sandwich panel configuration enables adequate flight performance for a UAS as well as ensuring adequate travel performance for a UGV, UUV or USV. The downside to using this type of configuration is that the amount of materials needed would present weight and cost challenges for drones. In addition, the explosive projectiles are not focused along a single trajectory path and would therefore decrease lethality at distances when compared to the blast chamber assembly 20 or 60 approach. Finally, the sandwich panel configuration 30 relies on ambient air or water located below the explosive munition 30 to vent below the drone. This increase in pressure beneath the drone could create thrust vectors and degrade flight stability or travel performance. Heat leaving the explosive event could also ignite debris in an urban environment or even set a house on fire.

Figure 8:
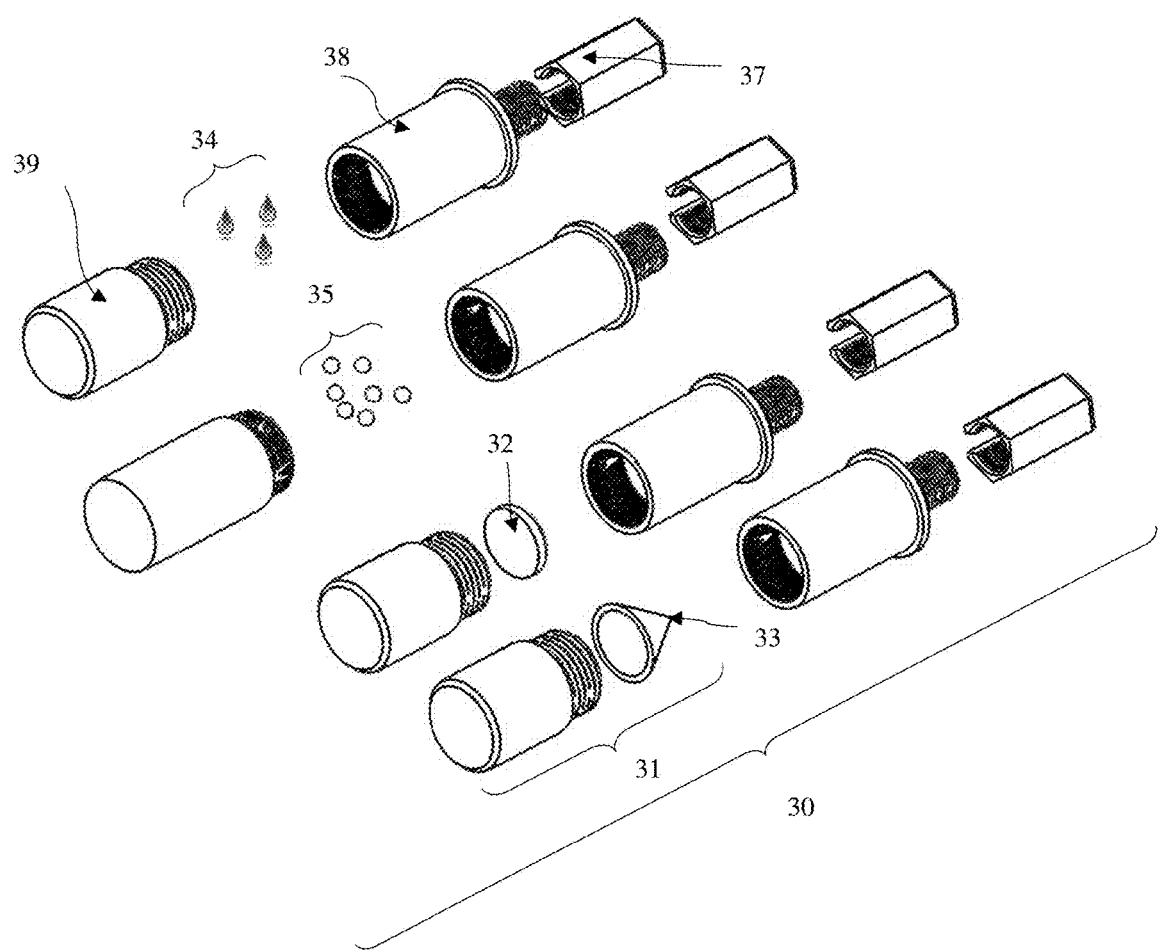
FIG. 8 is a perspective view of the explosive munitions 30 for one embodiment of the present invention.

FIG. 8 is an engineering drawing demonstrating some of the explosive munitions 30 that may be inserted into the blast chamber assemblies 20 and fired from the UAS 1 or a UGV, UUV or USV. The explosive munitions 30 consist of a munition housing 38, the projectile housing 39, a number of optional projectile inserts that fit within the projectile housing 39, an initiation system 36 (not shown) and a securing cap 37. The purpose of the explosive munitions 30 is to explosively propel projectiles through the blast chamber assembly 20 toward the intended target. To accomplish this, the optional projectile inserts are placed with the projectile housing 39 and bulk explosive is added within the device. The projectile housing 39 is then secured to the munition housing 38 and inserted into the inner tube 24 of the blast chamber assembly 20. An initiation system 36 is then attached to the munition housing 38 and secured in place with a securing cap 37.

The optional projectiles used as part of the explosive munitions 30 include water 34, directional fragmentation 35, explosively formed penetrators 32, and conical shape charges 33. Other projectiles not shown but that could be used include flying discs, stabilized explosively formed penetrators and more to name a few.

The purpose of each of these projectiles differs. An explosively formed penetrator 32 could be used to defeat light armor or specifically target hardened targets. A conical shape charge 33 could be used for penetrating heavy armor. Examples of these types of targets would include tanks or armored vehicles. Water 34 can be used to disrupt improvised explosive devices. Directional fragmentation 35 can be used for anti-personnel or against light skinned targets.

The explosive munitions 30 listed in FIG. 8 represent some of the options for explosive loads. To utilize the explosive munitions 30, explosives are combined with the projectiles to create a warhead 31. The warhead is then connected to the munition housing 38. A securing cap 37 is then utilized to hold the initiation system 36 within the munition housing 38 making it ready to fire.

Figure 9:
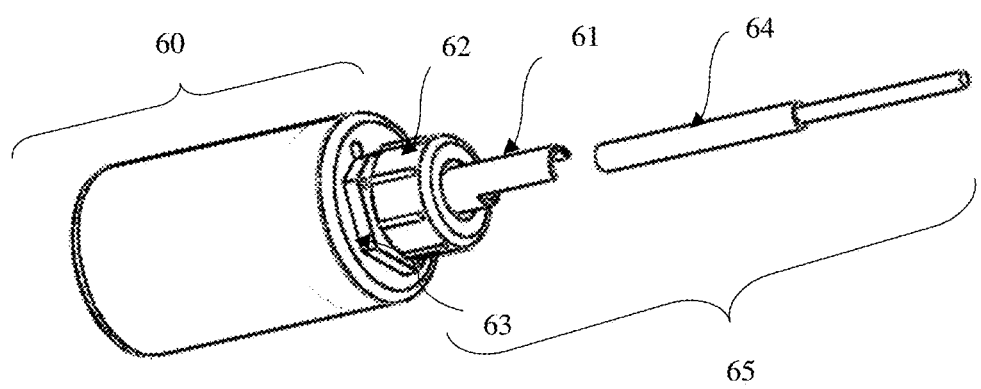
FIG. 9 is a perspective view of a second embodiment of the blast chamber assembly 60 and munitions 30.

FIG. 9 illustrates the blast chamber assembly 60 and the warhead package 65. The blast chamber assembly 60, contains the same components as blast chamber assembly 20; that is an outer tube 22, an internal tube 24, explosive mitigation material 23, and two end caps 21. When each of the components are assembled then an explosive projectile can be fired. The warhead package 65 includes the threaded cap receiver 63, the threaded cap 62, the warhead insert 61, and the initiation system 64. It should be noted that the configuration shown embodies a hand packed version of the energetic weapons pod 50 but that more permanent systems can also be used. Regardless of the configuration of a warhead package 65, the system still requires bulk explosives, an initiation system, and primary explosives or a detonator. In some cases, the warhead package 65 may also include the use of insensitive munitions.

Figure 10A:
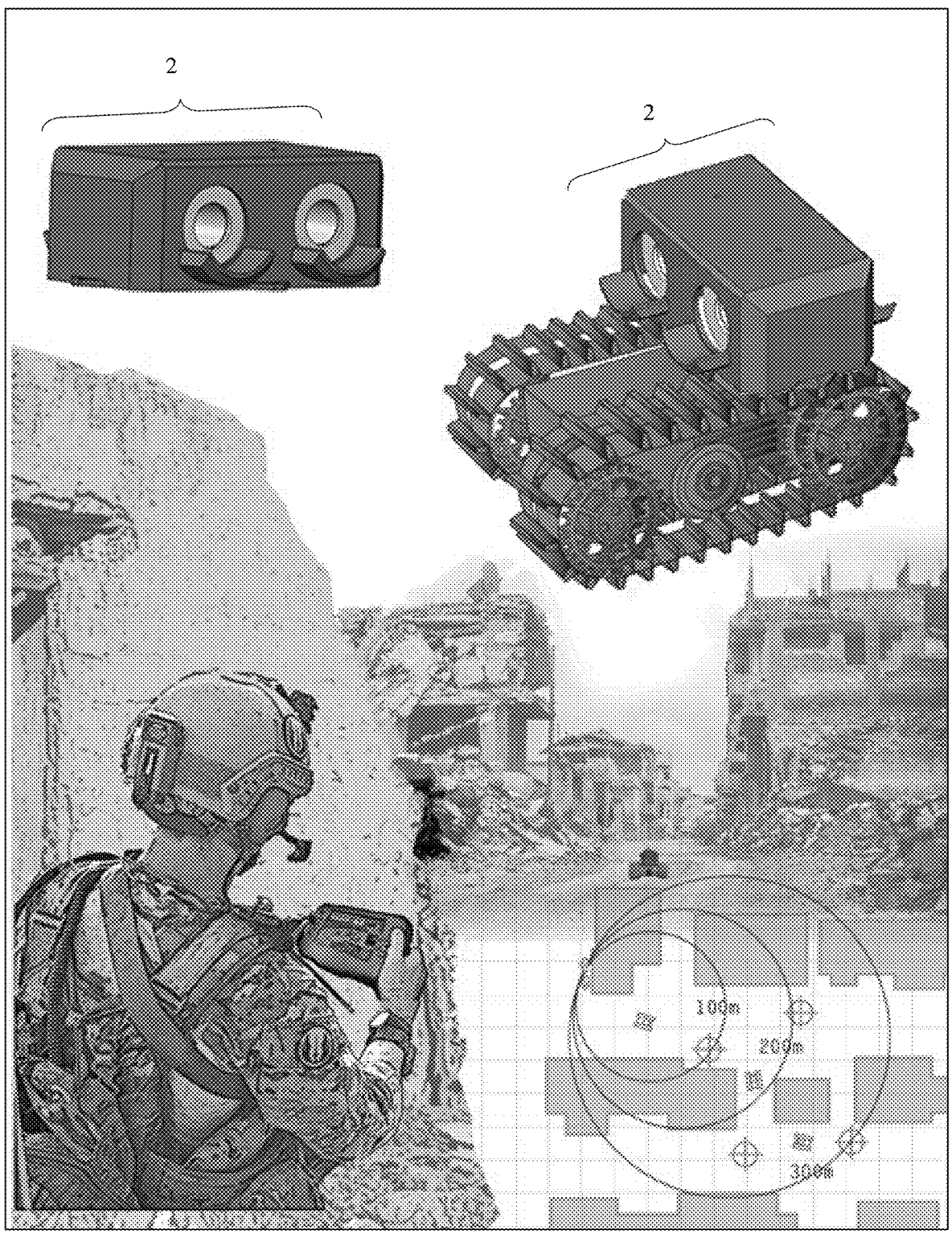
FIG. 10A is an illustration showing the configuration of the energetic weapons pod 2 when used in combination with unmanned ground systems and where the energetic weapons pod 2 relies on the targeting system 16, fire control system 3, and other features built into the unmanned ground alone system.
Figure 10B:
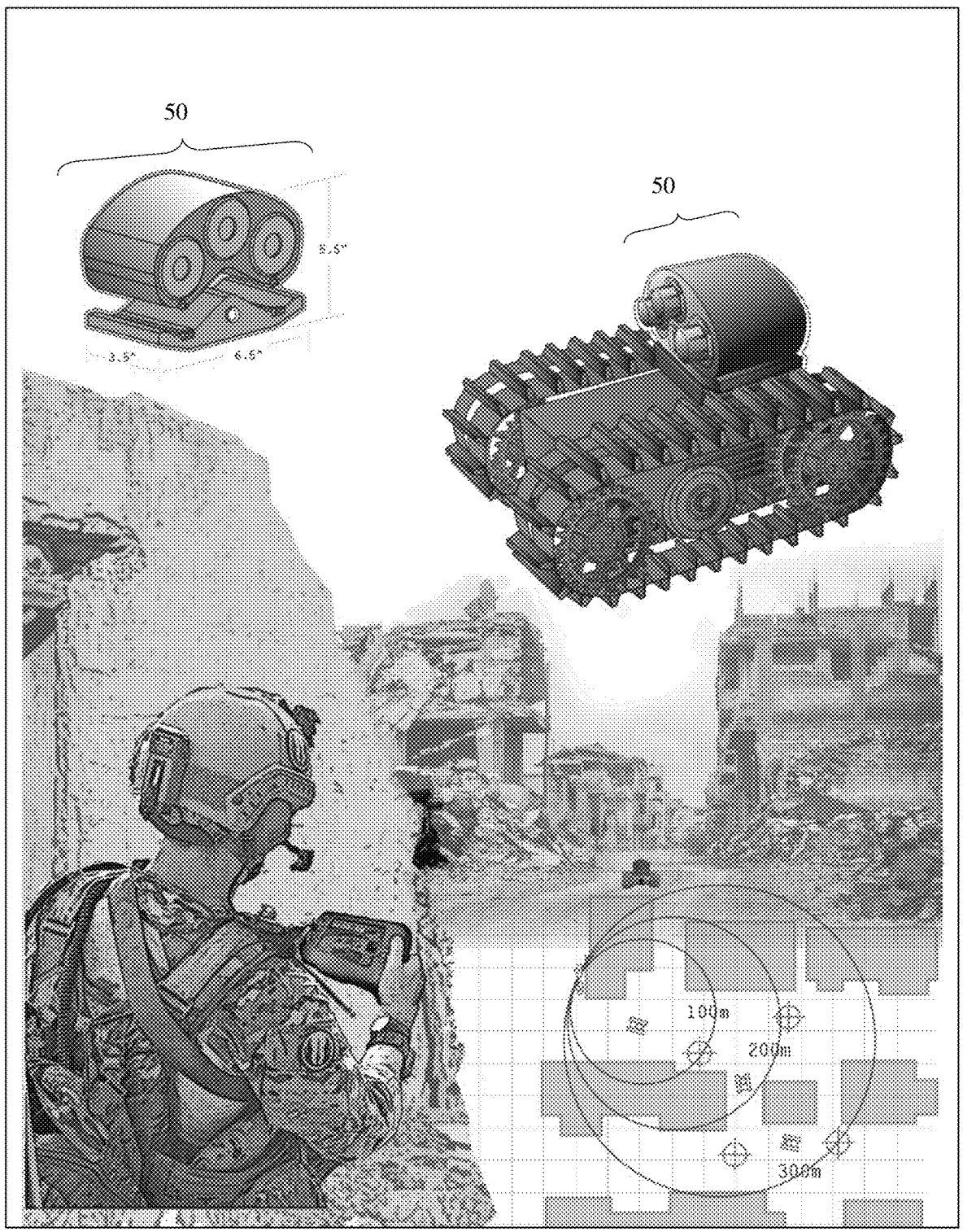
FIG. 10B is an illustration showing the configuration of the energetic weapons pod 50 when used in combination with unmanned ground systems and where the energetic weapons pod 50 has the targeting system 16, fire control system 3, and other features built into the upper housing 52 and/or lower housing 53 to form a standalone system

As shown in FIG. 9, the purpose of the threaded cap 62 is to secure the warhead insert 61 to the blast chamber assembly 60. The embodiment shown utilizes a plastic threaded cap 62 and a threaded cap receiver 63 that is fastened to the rear face of blast chamber assembly. When connected, the threaded cap 62 secures the warhead insert 61 so that the bulk explosives located within the warhead insert 61 are positioned directly in the middle of the blast chamber assembly 60. This ensures uniform failure of the system and collapse of the blast mitigation materials during detonation FIG. 10A is an artistic rendering of the energetic weapons pod 2 when configured to an unmanned ground vehicle. Here, the energetic weapons pod 2 is directly attached to a UGV which comprises cameras, night vision cameras, antennas, fire control systems, radios, electronic speed circuitry, motors, laser range detectors, computers, and sensors to support artificial intelligence, LIDAR electronic attack weapons, power sources, wiring, and other hardware/software items. Such UGV are commercially available, for example from Roboteam. Similarly, FIG. 10B is an artistic rendering of the energetic weapons pod 50 when configured to an unmanned ground vehicle. The FIG. 10A and FIG. 10B illustrations show the UGV entering an urban environment and being controlled by a single solider, who otherwise would be responsible for clearing targets within the city. Instead, the solider is using the energetic weapons pod 2 or 50 to engage multiple targets, maintain downrange awareness with the drone, and has the option of driving the drone back to his team to reload the device as required during sustained enemy engagements. Used in conjunction with soldiers flying UASs, use of the energetic weapons pod 2 and/or 50 on UVGs allows a coordinated swarm offensive strike.

Figure 11:
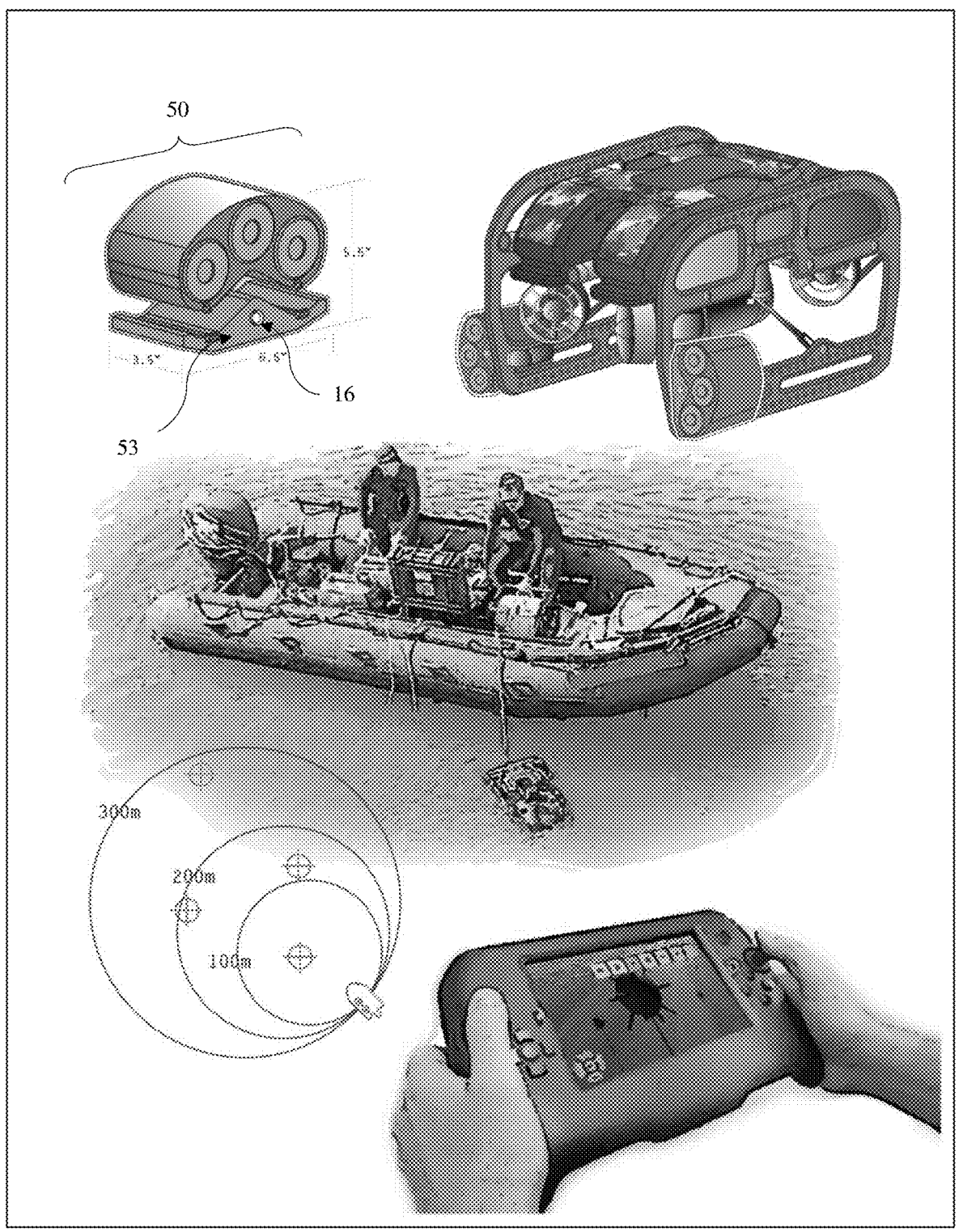
FIG. 11 is an illustration showing the configuration of the energetic weapons pod 50 when used in combination with unmanned underwater vehicle where the energetic weapons pod 50 has the targeting system 16, fire control system 3, and other features built into the upper housing 52 and/or lower housing 53 to form a standalone system.
Figure 12:
FIG. 12 is an illustration showing the configuration of the energetic weapons pod 50 when used in combination with unmanned underwater vehicle where the energetic weapons pod 50 has the targeting system 16, fire control system 3, and other features built into the upper housing 52 and/or lower housing 53 to form a standalone system.

FIG. 11 is an artistic rendering of the energetic weapons pod 50 where the system is integrated onto an underwater drone. This configuration of the energetic weapons pod 50 is more suitable for mine clearance operations where an explosive munition 30 could be used to neutralize sea mines or underwater explosive hazards. The same configuration could also be used to attack surface or subsurface enemy vessels in an attempt to degrade their warfighting capabilities.

FIG. 11 shows the configuration of the energetic weapons pod 50 where the system uses a targeting system 16 built into the lower housing 53 where two energetic weapons pods 50 are attached to an unmanned water vehicle. This configuration also shows that the blast shield 14 is not included as the underwater version does not require additional baffling due to the fact that underwater robots are capable of withstanding high pressures as they are rated for deep dives where pressures exceed the pressures generated during the detonation event.

Those familiar with explosive operations and drones will also recognize that similar configurations of the energetic weapons pod 2 and/or 50 could be adapted and integrated to other unmanned system platforms such as unmanned surface vessels, unmanned helicopters, unmanned airplanes, and others.

Operation of Device

For the first time explosive munitions 30 are capable of being fired directly from a drone or robot to enable repeatable remote strike capabilities without damaging the unmanned system.

The UAS 1 and the energetic weapons pod 2 are used in combination to enable the warfighter the ability to engage enemy combatants with fired explosive munitions 30. The unique combination of the UAS 1 and the energetic weapons pod 2 enables the UAS 1 to fire explosive munitions 30 without degrading flight performance. To achieve this, the UAS 1 and energetic weapons pod 2 use a blast chamber assembly 20 that is used to absorb and diffuse explosive energy generated during the detonation event. The blast chamber assembly 20 is also designed to provide recoilless firing of the explosive munition 30. In addition to the blast chamber assembly 20, the energetic weapons pod 2 is fitted with a blast shield 14 which directs the explosive energy away from critical flight components located externally and located on the UAS 1. Examples of these types of components include the propellers 9, motors 10, and the propeller support brackets 11. The positioning of these components, or other future components not shown, such as a gimbal camera or laser range finders to name a few, are located outside of the front explosive zone 5 and the rear explosive zone 6 to ensure system survivability. Similar advantages exist when the energetic weapons pod 2 is used with UGVs, UUVs, and/or USVs.

To utilize the energetic weapons pod 2 or 50, the end user must first insert the explosive munition 30 (which is loaded with explosives and the projectile of choice) within the blast chamber assembly 20 or 60. This is done by first connecting the initiation system 36 or 64 into the warhead 31 or warhead insert 61. The warhead 31 is then secured to the munition housing 38. The status of the munition 30 is then validated using the fire control system located within the airframe and housing 12 or within the upper housing 52 and lower housing 53. This arm/disarm and munition 30 validation is confirmed by observing the status of the weapon while using the ground control system.

In the event that the optional remote firing device is used, the end user may connect the initiation system 36 to the munition housing 38 ensuring that the initiation system 36 is in direct contact with the warhead 31. The other end of the initiation system 36 can then be connected to a remote firing device that is incorporated into the UAS, UGV, UUV, or USV. If using a UAS 1 with remote firing device housing 13, the remote firing device is then placed into the remote firing device housing 13 located beneath the airframe and housing 12. The arm/disarm status of the explosive munition 30 is then validated using the remote firing device transmitter. The energetic weapons pod 2 is then prepared for use.

The UAS 1, UGV, UUV, or USV may then proceed downrange to engage targets. Upon verifying a target using the targeting system 16 located within the energetic weapons pod 50 or within the UAS 1, UGV, UUV, or USV, the operator may fire one, two, or more explosive munitions 30 either independently or all at once. Upon firing, the initiation system 36 receives an electrical or mechanical input that explosively detonates the warhead 31. Upon detonation, the projectile (explosively formed penetrator 32, conical shape charge 33, water 34, directional fragmentation 35, or other any other number of projectiles) is explosively pushed down the internal tube 24 of the blast chamber assembly 20. The projectile exits the blast chamber assembly 20 and travels into and through the front explosive zone 5. At the same time, exhaust gases, high pressure, heat, and rogue fragmentation exit the blast chamber assembly 20 in the opposite direction. This results in the explosive byproducts traveling through the rear explosive zone 6. This forward and rearward energy release creates a nearly recoilless event where the blast chamber assembly 20 remains stable and where the system is vented nearly equivalently to ambient pressure.

Upon firing of the munition(s) 30, the UAS 1 can be flown back to the operator, and the UGV, UUV, or USV can be returned to the operator. Upon arrival, the operator may land the UAS 1, halt the UGV, UUV, or USV, remove the energetic weapons pod 2 by disconnecting the fasteners located at the attachment points 15 and then attach a new energetic weapons pod 2 or 50 to the UAS 1, UGV, UUV, or USV by reconnecting the fasteners at the attachment points 15. The explosive munitions 30 are then connected to the fire control system as described above and the UAS 1, UGV, UUV, or USV is ready to launch and reengage targets. Repeating this process, multiple target engagements may then be conducted as required.

What is claimed is:

1. A weapons pod comprising:
   (a) a container having an upper housing and an optional lower housing, the upper housing comprising
      (i) at least one pair of cut-out portions, the first cut-out portion located on one surface of the housing and the second cut-out portion located on a second surface of the housing, wherein the first and second cut-out portions are opposite from each other;
      (ii) at least one pair of protrusions from the housing associated with each pair of cut-out portions, the first protrusion located above the first cut-out portion and the second protrusion located above the second cut-out portion; and
      (iii) at least one securing mechanism configured to attach the upper housing to the optional lower housing and/or to attach the upper housing to an unmanned vehicle; and
   (b) at least one blast chamber assembly comprising
      (i) an outer tube;
      (ii) an internal tube open at each end; and
      (iii) explosive mitigation material configured to absorb detonation energy, gases, and/or fragmentation generated during an explosive event surrounding the internal tube and residing within the outer tube
   wherein upon detonation explosive gasses are exhausted out of each end of the at least one blast chamber assembly into a front explosive zone and a rear explosive zone.

2. The weapons pod according to claim 1, wherein a single blast chamber assembly is present.

3. The weapons pod according to claim 1, wherein multiple blast chamber assemblies are present.

4. The weapons pod according to claim 1, wherein the explosive mitigation material is made of foam metal or high strength carbon.

5. The weapons pod according to claim 4, wherein the explosive mitigation material is titanium or stainless steel or high strength carbon.

6. The weapons pod according to claim 1, wherein the securing mechanism comprises a latch system, living hinge type fastener, buckle, screws, bracket, and/or nuts and bolts and washers.

7. The weapons pod according to claim 6, wherein the securing mechanism comprises an O-ring or watertight seal.

8. The weapons pod according to claim 1, further comprising a munition.

9. The weapons pod according to claim 8, wherein the munition comprises an initiation system and a munition housing.

10. The weapons pod according to claim 8, wherein the munition comprises at least one explosive munition.

11. The weapons pod according to claim 8, wherein the at least one explosive munition is selected from the group consisting of water, directional fragmentation, explosively formed penetrators, and conical shape charges.

12. The weapons pod according to claim 1, further comprising an unmanned aerial system airframe and housing.

13. The weapons pod according to claim 12, further comprising a remote firing device housing.

14. The weapons pod according to claim 1, further comprising an unmanned ground vehicle.

15. A method of operating the weapons pod according to claim 1, comprising the steps of:
  (a) securing the blast chamber assembly to the upper housing;
  (b) connecting an initiation system to a warhead;
  (c) securing the connected initiation system and warhead to a munition housing to form a munition;
  (d) inserting the munition into the blast chamber assembly;
  (e) connecting the initiation system to a remote firing device; and
  (f) initiating firing of the warhead.

16. The method of operating the weapons pod according to claim 15, wherein the at least one pair of protrusions creates a front explosive zone and a rear explosive zone upon firing.

17. The method of operating the weapons pod according to claim 15, further comprising attaching the weapons pod to an unmanned aerial system airframe and housing.

18. The method of operating the weapons pod according to claim 17, wherein the unmanned aerial system airframe and housing is not damaged upon firing.

19. The method of operating the weapons pod according to claim 17, further comprising attaching a remote firing device to the unmanned aerial system airframe and housing prior to attaching the weapons pod to the unmanned aerial system airframe and housing.

20. The method of operating the weapons pod according to claim 15, further comprising directing the unmanned aerial system to a target prior to firing and directing the unmanned aerial system to return after firing.

21. The weapons pod of claim 1, wherein the blast chamber further comprises at least one end cap with an orifice.

22. The weapons pod of claim 21, wherein the at least one end cap has an orifice with an outer diameter equivalent to the outer diameter of the outer tube and an internal diameter equivalent to the internal diameter of the internal tube.

* * * * *